United States Patent Office 3,442,839
Patented May 6, 1969

3,442,839
COATING COMPOSITIONS COMPRISING AN UNSATURATED GLYCERIDE AND A NON-RUBBERY, UNSATURATED HYDROCARBON POLYMER
Howard L. Gerhart and Marco Wismer, Gibsonia, and Paul J. Prucnal, Cheswick, Pa., assignors to PPG Industries, Inc., Pittsburgh, Pa., a corporation of Pennsylvania
No Drawing. Filed Nov. 23, 1964, Ser. No. 413,327
Int. C08f 3/16, 15/40, 29/08
U.S. Cl. 260—23.5                              17 Claims

ABSTRACT OF THE DISCLOSURE

This invention relates to resinous compositions comprising an unsaturated glyceride oil and an interpolymer of a polyunsaturated hydrocarbon monomer and at least one monoolefin having a single copolymerizable ethylenic group, said interpolymer having an essentially saturated carbon chain containing a substantial proportion of the total carbon atoms in the polymer molecule, said interpolymer being characterized by the fact that it is substantially cured by oxidative mechanism.

---

This invention relates to resinous compositions comprising an interpolymer of ethylenic hydrocarbons and an unsaturated glyceride oil, and more particularly, to such compositions containing an interpolymer of a polyunsaturated hydrocarbon and one or more monoolefins.

Interpolymers of ethylene, propylene and similar ethylenic hydrocarbons containing small amounts of interpolymerized polyunsaturated compounds are of increasing interest. Such interpolymers are disclosed, for example, in United States Patents Nos. 2,933,480; 3,000,866, and 3,093,621; and in British Patent No. 880,904. These interpolymers, as known heretofore, are elastomers characterized by their rubbery properties, and in common with conventional rubbers, are cured by vulcanization, generally utilizing sulfur as the vulcanizing agent.

Although at times such rubbery polymers have been considered for use as coatings in certain specialized applications, they are not usable in ordinary protective and decorative surface coating compositions, due both to their lack of satisfactory application properties and because the coatings obtained have generally poor characteristics.

In copending application Ser. No. 413,326, filed on the same day herewith, there are disclosed interpolymers of ethylenic hydrocarbons and polyunsaturated compounds that can be employed in coating compositions applied by conventional means to provide cured coatings of desirable properties.

The basis for the present invention is the further discovery that compositions of highly desirable properties, particularly useful for coatings, comprise a combination of the aforesaid interpolymers and an unsaturated glyceride oil.

The unsaturated glyceride oils that are utilized in the invention include any of the various naturally occurring or synthetic drying, semi-drying and non-drying oils which contain glycerol esters of unsaturated fatty acids. Among the oils included are vegetable and marine oils such as linseed oil, soybean oil, tung oil, castor oil, dehydrated castor oil, oiticica oil, perilla oil, safflower oil, poppyseed oil, sunflower oil, tall oil esters, walnut oil, herring oil, menhaden oil, sardine oil, coconut oil, rapeseed oil, corn oil, and others of similar chemical nature.

It is particularly surprising that good results are obtained with oils of very low relative degrees of unsaturation, such as coconut oil; the films obtained from compositions containing such oils have good curing characteristics and provide coatings of good properties. However, for certain purposes, it is desirable to employ oils having a somewhat higher unsaturation content. A preferred class of such oils are the drying and semi-drying oils, which have an iodine value of about 90 or more, as determined by method ASTM-D1467-57T.

The interpolymers employed in this invention contain a substantial proportion of a polyunsaturated hydrocarbon, preferably having nonconjugated ethylenic groups, and interpolymerized therewith at least one monoolefin having a single copolymerizable ethylenic group. Both the interpolymers per se and the compositions of the present invention substantially cure by oxidative mechanism. Substantial curing by oxidative mechanism means that a thin film of the material upon exposure to air cures sufficiently to become tack-free and essentially insoluble in aliphatic hydrocarbons, such as heptane. While curing may continue for days, or even weeks, sufficient curing to achieve a tack-free state takes place within a reasonable time, 24 hours being usually taken as indicative.

The temperature of curing of the present compositions can vary; the preferred compositions substantially cure at ambient temperatures, and in any event below 100° F., but desirable materials can be produced which require somewhat higher curing temperatures, although in all cases the cure mechanism is oxidative. Driers, such as metal naphthenates, can be employed to accelerate the cure, or a high oxygen atmosphere and higher temperatures can be used for the same purpose. Cross-linking agents can also be added, or cure can be induced by ultraviolet or other radiation, with or without the presence of photosensitizers, such as benzophenones.

The interpolymers that are employed herein differ from the rubbery polymers known heretofore in several important respects. For example, the interpolymers herein contain a comparatively high degree of unsaturation, which permits their curing by an oxidative mechanism to a highly cross-linked structure. The preferred interpolymers utilized in accordance with this invention contain at least about 2 weight percent unsaturation, as defined below, and may have up to about 25 percent or even more.

Also, the interpolymers of this invention are of lower molecular weight, as indicated by their lower intrinsic viscosity compared to the rubbery polymers. (Intrinsic viscosity is described for example, in the book by Allen entitled "Techniques of Polymer Characterization," Butterworth Publications, Ltd., London, 1959; the values herein being measured in benzene at 25° C., using an Ubbelohde Dilution Viscometer.)

The intrinsic viscosity of the known rubbery polymers is at least 1.0, and usually 1.5 or higher, corresponding to a molecular weight of 50,000 or more. This is generally considerably higher than the intrinsic viscosity of the present interpolymers, which preferably have an intrinsic viscosity no higher than about 0.6, and usually quite lower; interpolymers of somewhat higher intrinsic viscosity can be employed for coatings in accordance with this invention, so long as the degree of unsaturation mentioned above is present. The present interpolymers are much more soluble in organic solvents than are the aforesaid rubbery polymers, thereby permitting the compositions of the invention to be dissloved in appreciable concentrations while maintaining a usable solution viscosity. Solutions of usable viscosity of the present compositions in benzene, xylene, aromatic naphtha, or other solvents, containing as much as 70 percent or more resin solids can be obtained.

The interpolymers employed herein also differ from many hydrocarbon polymers in that they have an essentially saturated carbon chain as the polymer backbone, this chain containing a substantial proportion (i.e., 20 percent or more) of the total carbon atoms in the polymer molecule. This polymer backbone, while essentially or predominantly saturated, contains some ethylenic unsaturation, principally in terminal position. At least a major part of the unsaturated linkages remaining in the polymer molecules are in pendant groups attached to the main polymer chain and are derived from the ethylenic linkages in the polyunsaturated component of the interpolymer.

The extent of unsaturation in the interpolymers is sufficient to permit their curing by oxidative mechanism, which in general requires at least about 2 percent by weight of unsaturation. "Percent by weight of unsaturation" means herein the weight of groups of the structure

compared to the total weight of interpolymer. For instance, 2 percent by weight of unsaturation means each 100 grams of interpolymer contain 2 grams of carbon present in groups of the structure

The extent of unsaturation in the interpolymer in a large part determines the curing characteristics of the composition with the oil; the preferred compositions are made from interpolymers having at least about 2.5 percent by weight of unsaturation, and for good curing characteristics at ordinary room temperatures, it is desirable that the interpolymer contain at least about 3.5 percent by weight unsaturation. The extent of unsaturation can be determined by infra-red analysis or nuclear magnetic resonance analysis, or by other means.

The proportions of the components of the interpolymer can be varied widely, it being necessary only to provide sufficient unsaturation in the polymer to permit oxidative curing. The amount varies with the particular polyunsaturated compound. For instance, there should be interpolymerized along with the monoolefin or monoolefins at least about 11 percent of dicyclopentadiene or similar diene.

Among the polyunsaturated compounds that can be employed in producing the interpolymers herein are the various dienes and polyenes. It is preferred that the polyunsaturated hydrocarbon contain nonconjugated ethylenic groups, and it is also preferred that it be alicyclic, this being particularly the case when the polyunsaturated compound contains conjugated unsaturation. Thus, nonconjugated polyenes and conjugated alicyclic polyenes are preferred to conjugated aliphatic polyenes.

Included among the polyunsaturated compounds that can be employed are cyclic polyenes such as cycloalkadienes; substituted norbornenes, e.g., 5-alkenyl-2-norbornenes; substituted norbornadienes, e.g., 2-alkyl norbornadienes; unsaturated terpenes, such as limonenes; and similar compounds. The polyene may contain substituents, such as halogen or oxygen-containing radicals, but in general it is preferred to employ unsubstituted hydrocarbons containing only carbon and hydrogen.

Some representative examples of specific polyunsaturated compounds that can be utilized are:

1,4-pentadiene
3,3-dimethyl-1,5-hexadiene
1,9-octadecadiene
6-methyl-1,5-heptadiene
1,3-cyclopentadiene
5-methyl-1,3-cyclopentadiene
Dicyclopentadiene
Tricyclopentadiene
Divinylbenzene
1,5-cyclooctadiene
1,5-cyclododecadiene
1,5,9-cyclododecatriene
1,4,6-cyclooctatriene
5-(2'-butenyl)-2-norbornene
5-(2'-heptyl-1'-undecenyl)-2-norbornene
5-methylene-2-norbornene
2-methyl norbornadiene
2-heptyl norbornadiene
1,8(9)-p-menthadiene Although compositions satisfactory for some purposes can be made from interpolymers of a polyunsaturated compound with a single monoolefin, e.g., copolymers of ethylene and dicyclopentadiene, or propylene and dicyclopentadiene, it is preferred to employ interpolymers of at least two comonomers with the polyunsaturated compound, one of these being ethylene. It is further preferred that ethylene comprise a substantial proportion of the interpolymer, .ie., at least about 30 percent by weight. It is desirable that the interpolymer be amorphous rather than substantially crystalline, and the tendency of ethylene to form crystalline polymers is reduced by the inclusion of a second comonomer.

Thus, a class of preferred interpolymers comprises a nonconjugated diene, ethylene, and at least one other monoolefin having a single terminal ethylenic group. Examples of the large number of such usable comonomers include those having the formula

where R is alkyl having, for example, up to about 20 carbon atoms, or aryl, and R' is hydrogen or alkyl of up to about 20 carbon atoms. Compounds of this class include propylene, 2-methylpropene, 2-propylhexene-1, 1-butene, 4-methyl-1-pentene, 1-pentene, 1-hexene, 1-octene, 5-methyl-1-nonene, 5,6,6-trimethyl-1-decene, 1-dodecene, 1-tetradecene, 1-octadecene, styrene and vinyl toluene.

The proportion of the second comonomer is not criticalcal since, as mentioned, copolymers of a single monoolefin of the class described with the polyunsaturated compound can be employed. The preferred proportions vary depending on the identity of the particular monomers. For example, the preferred interpolymers of ethylene, propylene, and a nonconjugated diene, usually dicyclopentadiene, generally contain from about 10 percent to about 70 percent of ethylene, from about 10 to about 40 percent of propylene, and from about 5 to about 50 percent of the diene, with the minimum amount of diene depending to some extent upon its molecular weight. (The above percentages are by weight; the same is true of all parts and percentages throughout this specification unless otherwise specified.)

One method of producing the interpolymers is by carrying out the interpolymerization of the aforesaid monomers in the presence of a catalyst composed of an organic vanadium compound and an alkyl aluminum halide co-catalyst. The most efficient organic vanadium compounds have been found to be vanadium tris(acetylacetonate) and vanadium oxybis(acetylacetonate). Defining the concentration of catalyst employed in terms of the amount of vanadium compound in the reaction mixture, no higher than 0.002 mole of vanadium compound per liter should be employed in order to produce the desired products in efficient amounts.

The alkyl aluminum halide co-catalyst utilized along with the vanadium compound is typically ethyl aluminum dichloride, ethyl aluminum sesquichloride, diethyl aluminum chloride, butyl aluminum sesquichloride, ethyl aluminum sesquiiodide, or other alkyl aluminum halide. The concentration of the co-catalyst is not ordinarily critical; it is usually employed in an amount between about 3 to 30 moles per mole of vanadium compound.

In carrying out the preparation of the interpolymer, there is employed a liquid reaction medium, which is suitably an organic solvent or one of the reactants in liquid form. Suitably purified xylene or a similar aromatic solvent is generally utilized. For efficient operation, care should be taken to exclude oxygen and moisture. The temperature is maintained at room temperature or preferably below, e.g., 15° C. or lower, with temperatures as low as −80° C. or lower being advantageously utilized. One or more of the reactants is usually a gas, and they are generally fed to the reaction vessel as the polymerization progresses. Atmospheric pressure can be utilized in carrying out the interpolymerization reaction, but it is usually more efficient t o employ elevated pressures, even up to 1000 atmospheres or more. There may be included in the polymerization mixture, if desired, a molecular weight regulator, such as hydrogen or zinc dialkyl.

In a typical procedure for production of the interpolymers, the solvent is saturated with the ethylene and/or propylene or other gaseous monomer, and the polyunsaturated compound and any other non-gaseous monomer is added, followed by the alkyl aluminum halide. The polymerization is commenced by the addition of the vanadium compound and the gaseous monomers are added continuously, using an excess in order to maintain saturation of the mixture. If desired, increments of the vanadium compound, the alkyl aluminum halide, or both, can be added during the polymerization, and a second portion of the polyunsaturated compound is usually added. Alternatively, one or both of the catalysts and the polyunsaturated compound can be added continuously. The catalysts are usually added as dilute solutions in aliphatic or aromatic hydrocarbons. At the end of the polymerization, residual catalyst is removed by treatment of the reaction mixture with aqueous hydrochloric acid and washing with distilled water until acid-free. Part of the solvent can then be distilled off if desired, and there can also be removed unreacted polyunsaturated compounds, although it is not necessary to remove unreacted materials.

Widely varying proportions of the unsaturated glyceride oil and the interpolymer can be utilized. Very low amounts of the oil, i.e., 1 percent by weight or less, based on the total composition, provide compositions of value, and, conversely, similarly small amounts of the above-described interpolymers added to an oil provide beneficial results and improved properties. obviously, purposes, including the composition and level of unsaturation of both the oil and the interpolymer, the properties desired, and the like. Generally speaking, from about 5 percent to about 70 percent of the oil, based on the total weight of oil and interpolymer, is employed (all weights being based on non-volatile resin solids).

The oil and the interpolymer can be combined in various ways. The oil can be added to the polymerization mixture prior to or during the interpolymerization, and specific desired properties can be obtained in this manner. It is usually preferred to add the oil to the preformed interpolymer; reaction between the components may then take place, with or without added heat or other reaction-promoting conditions, or they may co-react during curing.

The compositions described above can be formulated into coating compositions for either clear coatings or pigmented paints, using conventional pigments and additives. They can be utilized in ordinary solvent based compositions employing toluene, xylene, benzene, naphtha, and similar aromatic or aliphatic solvents, or in water-containing emulsions, either water-in-oil or oil-in-water. They can also be applied as dispersions in plasticizers and/or organic solvents, i.e., as plastisols or organosols.

As discussed above, these compositions can be cured in the presence of oxygen either at ambient temperature or, more suitably, at somewhat elevated temperatures to provide films of good adhesion to most substrates, including iron, steel, phosphatized or other steel, aluminum, copper, nickel, tin and other metals, as well as wood, glass plastics such as polyesters, and most primers.

The cured films produced have excellent hardness, flexibility, abrasion resistance, chemical resistance, and similar properties. While complete curing in most cases takes place without additives at temperatures as low as 50° F. or lower over a period of time, it is desirable to heat the film, for instance, to 275° F. to 350° F. for 10 to 40 minutes. Curing temperatures as high as 500° F. or even higher can be utilized.

Curing is also accelerated by the addition of certain driers commonly employed in oxidative cured films. Manganese and cobalt naphthenates are highly desirable in this respect, although other driers, such as lead and other metal naphthenates, octoates and linoleates are also of utility, as are similar compounds of these and other heavy metals such as cerium, iron, chromium, copper and nickel.

To illustrate the invention, there are given below several examples of the method and practice of the invention. All parts and percentages are by weight unless otherwise specified.

Example 1

An interpolymer was produced by charging a thoroughly clean and dry reaction vessel that had been flamed and cooled under a stream of nitrogen with 3 liters of dried benzene, which was sparged with nitrogen for 15 minutes. While passing ethylene and propylene at the rate of 6 liters per minute each into the solution, there were added 52.8 milliliters of dicyclopentadiene, the mixture was cooled to 5° C., and 6.0 milliliters of a 1.0 molar solution of ethyl aluminum sesquichloride in benzene were then added. Cooling was maintained throughout the polymerization, which was initiated by the addition of 15.0 milliliters of a 0.02 molar solution of vanadium oxy-bis(acetylacetonate) in benzene. Polymerization began immediately, as evidenced by the rise in the temperature to 8° C. and complete absorption of all gases passing into the solution, i.e., no off-gas could be observed. After about 1 minute, off-gas began to be observed once more; reaction conditions were maintained for 6 minutes after the addition of the vanadium compound, during which time the temperature dropped slowly to 5° C.

There were then added 20 milliliters of methanol and the reaction mixture was washed with aqueous HCl and then washed with distilled water until acid-free. Benzene was removed by evaporation at reduced pressure at room temperature or below, and when most of the benzene had been removed, about 2 liters of aromatic naphtha (boiling range 150° C. to 170° C.; Solvesso 100) was added and stripping was continued until about most of the Solvesso 100 had been removed, thus also removing the residual dicyclopentadiene and benzene. The solution obtained had a solids content of 13.3 percent.

The above interpolymer was mixed in the proportions as set forth in Table I with linseed oil based on the total weight of the oil and interpolymer. There was added to each of these compositions 0.12 percent by weight of metal, based on resin solids, as a 10 to 1 ratio of manganese naphthenate and cobalt naphthenate. Films of the compositions were drawn on phosphatized steel panels (Bonderite 1000) and air-dried at room temperature (about 25° C.); the coatings were tack-free in 3 hours. Other similar films were baked at 300° F. for 30 minutes. All the films were then tested for hardness on a Sward Rocker, for impact resistance on a Gardner Variable Impact Tester, and for solvent resistance by wiping 20 times with a cloth saturated with xylene. The results are shown in Table I, along with similar data from a coating of 100 percent linseed oil with drier added as above.

TABLE 1

| Linseed oil conc. (percent) | Cure | Film thickness (mils) | Sward hardness | Impact resistance [2] | Solvent resistance |
|---|---|---|---|---|---|
| 40 | Air-dry [1] | 0.9 | 12 | 80/80 | Good. |
| 55 | do [1] | 1.0 | 6 | 80/80 | Fair. |
| 70 | do [1] | 0.4 | 5 | 80/80 | Poor. |
| 100 | do [1] | | Tacky | | |
| 40 | Baked | 1.2 | 26 | 80/80 | Good. |
| 55 | do | 1.5 | 18 | 80/80 | Do. |
| 70 | do | 0.6 | 13 | 80/80 | Do. |
| 100 | do | 1.2 | 4 | 80/80 | Fair. |

[1] 42 hours.
[2] Inch-lbs., direct/reverse, 80 inch-lb. maximum tested.

Example 2

An interpolymer was produced as in Example 1; the product solution had a solids content of 13.1 percent. Compositions were produced from the interpolymer and coconut oil, with added drier as in Example 1. Compositions containing 10 percent, 20 percent and 40 percent of oil, based on solids, were made. Films were drawn as in Example 1, either air-dried or baked at 300° F. for 30 minutes, and tested for hardness, as indicative of curing. The results are shown in Table II, along with those from corresponding 100 percent oil films (with drier).

TABLE II

| Coconut oil conc. (percent) | Cure | Film thickness (mils) | Sward hardness |
| --- | --- | --- | --- |
| 10 | Air-dry [1] | 0.6 | 24 |
| 20 | do [1] | 0.5 | 12 |
| 40 | do [1] | 0.6 | ([2]) |
| 100 | do [1] | Wet and tacky | |
| 10 | Baked | 0.3 | 36 |
| 20 | do | 0.6 | 22 |
| 40 | do | 0.4 | 17 |
| 100 | do | Wet and tacky | |

[1] 18 hours.
[2] Surface oil prevented accurate measurement.

Example 3

Example 2 was repeated using raw castor oil in place of coconut oil. The results are shown in Table III.

TABLE III

| Castor oil conc. (percent) | Cure | Film thickness (mils) | Sward hardness |
| --- | --- | --- | --- |
| 10 | Air-dry [1] | 0.4 | 17 |
| 20 | do [1] | 0.7 | 12 |
| 40 | do [1] | 0.9 | 4 |
| 100 | do [1] | Wet and tacky | |
| 10 | Baked | 0.6 | 24–38 |
| 20 | do | 0.5 | 26–32 |
| 40 | do | 0.8 | 9 |
| 100 | do | Tacky | |

[1] 18 hours.

Examples 4–6

Using the interpolymer of Example 1, compositions were produced containing 50 percent by weight of various oils. To these there were added lead, manganese and cobalt naphthenates in amounts equivalent to 0.4 percent, 0.2 percent and 0.1 percent metal respectively, based on solids. Films were drawn on steel panels, baked for 30 minutes at 300° F. and tested as before. Results are shown in Table IV.

TABLE IV

| Example | Oil | Sward hardness | Impact resistance | Solvent resistance |
| --- | --- | --- | --- | --- |
| 4 | Soybean | 25 | 80/80 | Good. |
| 5 | Safflower | 32 | 80/80 | Do. |
| 6 | Dehydrated castor oil | 27 | 80/80 | Do. |

Other tests have shown that various oils and interpolymers of the class described can be substituted for those of the examples; for instance, the interpolymers described in the examples of the copending application referred to above can be utilized in the compositions of Examples 1 to 6 herein, with essentially equivalent results.

According to the provisions of the patent statutes, there are described above the invention and what are now considered to be its best embodiments. However, within the scope of the appended claims, it is to be understood that the invention can be practiced otherwise than as specifically described.

We claim:

1. A resinous composition comprising an unsaturated glyceride oil and a non-rubbery interpolymer of a cyclic polyene monomer and at least one monoolefin having a single copolymerizable ethylenic group, said interpolymer having an essentially saturated carbon chain containing a substantial proportion of the total carbon atoms in the polymer molecule, said interpolymer having an intrinsic viscosity no higher than about 0.6 and containing at least about 2.5 percent by weight of ethylenically unsaturated groups in the polymer molecule.

2. A resinous composition comprising an unsaturated glyceride oil and a non-rubbery interpolymer of a cyclic polyene monomer having nonconjugated ethylenic groups and at least one monoolefin having a single terminal ethylenic group, said interpolymer having an essentially saturated carbon chain containing a substantial proportion of the total carbon atoms in the polymer molecule and containing at least about 2.5 percent by weight of ethylenic unsaturation in the polymer molecule, said interpolymer having an intrinsic viscosity of no higher than about 0.6.

3. The composition of claim 2 in which said monoolefin comprises ethylene.

4. The composition of claim 2 in which said unsaturated glyceride oil is a drying oil having an iodine value of at least about 90.

5. A resinous composition comprising an unsaturated glyceride oil and a non-rubbery interpolymer of a nonconjugated cyclic diene, ethylene and propylene having an essentially saturated carbon chain containing a substantial proportion of the total carbon atoms in the polymer molecule and containing at least about 2.5 percent by weight of ethylenic unsaturation in the polymer molecule, said interpolymer having an intrinsic viscosity no higher than about 0.6.

6. A coating composition which comprises a film-forming resinous composition comprising an unsaturated glyceride oil and a non-rubbery interpolymer of a cyclic polyene monomer and at least one monoolefin having a single copolymerizable ethylenic group, said interpolymer having an essentially saturated carbon chain containing a substantial proportion of the total carbon atoms in the polymer molecule, said interpolymer having an intrinsic viscosity no higher than about 0.6 and containing at least about 2.5 percent by weight of ethylenically unsaturated groups in the polymer molecule.

7. A coating composition which comprises a film-forming resinous composition comprising an unsaturated glyceride oil and a non-rubbery interpolymer of a cyclic diene, ethylene, and at least one other monoolefin having a single terminal ethylenic group, said interpolymer having an essentially saturated carbon chain containing a substantial proportion of the total carbon atoms in the polymer molecule, said interpolymer having an intrinsic viscosity of no higher than about 0.6 and containing at least about 2.5 percent by weight of ethylenically unsaturated groups in the polymer molecule.

8. The coating composition of claim 7 in which said interpolymer contains from about 10 percent to about 70 percent by weight of ethylene.

9. The coating composition of claim 7 in which said unsaturated glyceride oil is a drying oil having an iodine value of at least about 90.

10. A coating composition which comprises a film-forming resinous composition comprising an unsaturated glyceride oil and a non-rubbery interpolymer of a nonconjugated cyclic diene, ethylene, and at least one other monoolefin of the formula

where R is selected from the class consisting of alkyl of up to about 20 carbon atoms and aryl, and R' is selected from the class consisting of hydrogen and alkyl of up to about 20 carbon atoms, said interpolymer having an essentially saturated carbon chain containing a substantial proportion of the total carbon atoms in the polymer molecule, said interpolymer having an intrinsic viscosity of no higher than about 0.6 and containing at least about 2.5 percent by weight of ethylenically unsaturated groups in the polymer molecule.

11. The coating composition of claim 10 in which said unsaturated glyceride oil is a drying oil having an iodine value of at least about 90, and said interpolymer is comprised of from about 15 to about 50 percent by weight of a nonconjugated cyclic diene, from about 10 to about 40 percent by weight of propylene, and from about 10 to about 70 percent by weight of ethylene.

12. The coating composition of claim 11 in which said nonconjugated diene is dicyclopentadiene.

13. An organic solvent based coating composition which comprises inert organic solvent and a film-forming resinous composition comprising an unsaturated glyceride oil and a non-rubbery interpolymer of a cyclic polyene monomer and at least one monoolefin having a single terminal ethylenic group, said interpolymer having an essentially saturated carbon chain containing a substantial proportion of the total carbon atoms in the polymer molecule, said interpolymer having an intrinsic viscosity of no higher than about 0.6 and containing at least about 2.5 percent by weight of ethylenically unsaturated groups in the polymer molecule.

14. The composition of claim 2 wherein the cyclic polyene is dicyclopentadiene.

15. The composition of claim 3 wherein the cyclic polyene is dicyclopentadiene.

16. The composition of claim 4 wherein the cyclic polyene is dicyclopentadiene.

17. The composition of claim 5 wherein the cyclic polyene is dicyclopentadiene.

References Cited

UNITED STATES PATENTS

| | | | |
|---|---|---|---|
| 2,762,851 | 9/1956 | Gleason | 260—669 |
| 3,313,793 | 4/1967 | De Lamare et al. | 260—94.7 |
| 3,342,769 | 9/1967 | Souffie | 260—33.6 |
| 2,546,020 | 3/1951 | Sparks et al. | 260—85.3 |
| 2,616,863 | 11/1952 | Block et al. | 260—23.7 |
| 3,000,866 | 9/1961 | Tarney | 260—80.5 |
| 3,132,034 | 5/1964 | Mayer | 106—265 |
| 3,291,780 | 12/1966 | Gladding et al. | 260—80.5 |
| 3,294,565 | 12/1966 | Svrchek | 106—265 |

DONALD E. CZAJA, *Primary Examiner.*

R. A. WHITE, *Assistant Examiner.*

U.S. Cl. X.R.

106—265, 23.7; 260—33.6